United States Patent [19]

Kojima et al.

[11] Patent Number: 4,505,757
[45] Date of Patent: Mar. 19, 1985

[54] METHOD FOR A SPECIFIC DEPOLYMERIZATION OF A POLYSACCHARIDE HAVING A ROD-LIKE HELICAL CONFORMATION

[75] Inventors: Takemasa Kojima, Yokohama; Kengo Tabata; Toshio Yanaki, both of Kobe; Mitsuaki Mitani, Sagamihara, all of Japan

[73] Assignees: Kaken Pharmaceutical Co. Ltd.; Taito Co., Ltd., both of Tokyo, Japan

[21] Appl. No.: 460,300

[22] Filed: Jan. 24, 1983

[30] Foreign Application Priority Data

Feb. 16, 1982 [JP] Japan .................... 57-237241

[51] Int. Cl.$^3$ .............................................. C13K 13/00
[52] U.S. Cl. ...................................... 127/36; 127/46.1; 536/114; 536/124
[58] Field of Search ................ 127/2, 9, 38, 46.1, 127/55; 536/80, 114, 124; 424/180

[56] References Cited

U.S. PATENT DOCUMENTS

| | | | |
|---|---|---|---|
| 4,098,661 | 7/1978 | Kikumoto et al. | 204/158 S |
| 4,115,146 | 9/1978 | Saint-Lebe et al. | 127/38 |
| 4,143,201 | 3/1979 | Miyashiro et al. | 536/102 |
| 4,155,884 | 5/1979 | Hughes | 536/102 |
| 4,342,603 | 8/1982 | Daniels | 127/58 |

FOREIGN PATENT DOCUMENTS

| | | | |
|---|---|---|---|
| 0008241 | 2/1980 | European Pat. Off. | 536/102 |
| 52-21064 | 6/1977 | Japan | 127/38 |

Primary Examiner—Peter Hruskoci
Attorney, Agent, or Firm—Oblon, Fisher, Spivak, McClelland & Maier

[57] ABSTRACT

The description describes a process for depolymerization of a polysaccharide having a rod-like helical structure, comprising a step for forcing a solution of the polysaccharide in a solvent (solvent A) through a capillary at a high shear rate, to produce a lower molecular weight degraded polysaccharide, which has the same repeating unit and the same helical structure, as those of the original polysaccharide.

9 Claims, 1 Drawing Figure

METHOD FOR A SPECIFIC DEPOLYMERIZATION OF A POLYSACCHARIDE HAVING A ROD-LIKE HELICAL CONFORMATION

BACKGROUND OF THE INVENTION

1. Field of the Invention

The present invention relates to the specific depolymerization of a polysaccharide having a rod-like helical conformation.

2. Description of the Prior Art

Several viscous polysaccharides such as xanthan, lentinan, schizophyllan, scleroglucan or curdlan, have been found to have two or three stranded helical structures. (T. Norisuye, et. al; J. Polymer Science, Polymer Physics Ed. 18, 547–558 (1980): E. D. T. Atkins and K. D. Parker; J. Polymer Science Part C. 28, 69–81 (1969); T. L. Bluhm and A. Sarko; Can. J. Chem. 55, 293–299 (1977): R. H. Marchessault, et. al; Can. J. Chem. 55, 300–303 (1977): E. R. Morris; A.C.S. Symposium Series, n, 45, 81 (1977): E. R. Morris, et. al; J. Mol. Biol. 110, 1 (1977)). Exploitation of the potentials of these polysaccharides has been investigated and some were developed as thickening agents for food industry based on their high viscosities, and others were found to have potent, host-mediated anti-tumor activities. But in some cases, the extremely high viscosities of their solutions make their utilizations difficult.

In order to reduce their viscosities properly, we invented an ultrasonic method for depolymerization of the polysaccharides. (Japanese Patent Laid open No. (Kokai) 57335/1977) Our investigations on the mode of the ultrasonic depolymerization confirmed that it is caused mainly by the cleavages of the main chain of the polysaccharide and that neither side chain nor carbon-carbon bond in glucose residue is cleaved during the sonic depolymerization. Thus, the resulting degraded polysaccharide consists of the same repeating unit and also has the same helical conformation, as those of the original polysaccharide.

Recently, we found that the ultrasonic depolymerization method is not suited for industrial depolymerization of a large bulk of polysaccharide, because of its low efficiency. The ultrasonic depolymerization method is also involved in high noise-level and erosion of the vibrating rod of the ultrasonic oscillator.

SUMMARY OF THE INVENTION

It is an object of the present invention to depolymerize a polysaccharide having a rod-like helical structure by forcing its solution to flow at a high shear rate.

Another object of the present invention is to provide a special degraded polysaccharide, which consists of the same repeating unit and the helical conformation as those of the starting polysaccharide. A solution of the degraded polysaccharide exhibits extremely lower viscosity in comparison with that of the starting polysaccharide, and the polysaccharide still holds the chemical and physical features such as antitumor activity of the original polysaccharide except for the molecular weight and viscosity. The reduction in the viscosity of the solution is helpful for its industrial utilization. For example, it makes administration of the polysaccharide easy in a case of its clinical uses as an anticancer drug, or a thixotropic solution of the starting polysaccharide turns Newtonian fluid, improving the fluidity of a food containing the polysaccharide.

The depolymerization according to the present invention is performed by forcing a solution of the polysaccharide to pass through a capillary at a high shear rate, preferably higher than $1 \times 10^4 \sec^{-1}$. Examples of the polysaccharides used in the present method are beta-1,3-D-glucans and xanthan gum.

The depolymerization-efficiency of the present method was found to become higher, as the concentration of the polysaccharide-solution increases, especially when it is higher than 0.1 wt.%. The addition of a solvent (solvent B) to the polysaccharide-solution was also found to increase the efficiency of the depolymerization according to the present method, where solvent B is miscible with the solvent (solvent A) of the polysaccharide-solution and does not dissolve the polysaccharide.

The present invention was derived from the finding that the treatment of a solution of the polysaccharide under a high shear rate depolymerizes the polysaccharide in a manner similar to that of the ultrasonic treatment; i.e., only main chain of the polysaccharide but neither other glucosidic linkages nor carbon-carbon bonds in the glucose residues are cleaved during the present depolymerization treatment.

The helical-structural polysaccharide is known to dispersed into single chains in a specific condition, e.g., beta-1,3-D-glucan disperses to single chains in dimethyl sulfoxide or alkaline solutions. When the dimethyl sulfoxide solution is diluted with water or the alkaline solution is neutralized with acid, the helical structure of the polysaccharide is not recovered, but, by random association, a large aggregate is formed. The present invention is useful only for a solution of the polysaccharide having a helical structure, but not for that having a single chain structure or an aggregated conformation.

The present method is capable of overcoming the foregoing disadvantages, such as low efficiency, high noise-level or erosion of the vibrating rod of the ultrasonic oscillator, as seen in the ultrasonic depolymerization method.

Acid hydrolysis and enzymic degradation of a polysaccharide have been known. Acidhydrolysis cleaves equally all glucosidic linkages of the polysaccharide, while enzymic degradation causes the hydrolysis of a specific glucosidic linkage. But their depolymerization modes are significantly different from those of ultrasonication and the present method. They liberate very low molecular weight mono- or oligo-saccharides and cannot afford quantitatively degraded polysaccharide, which has the same chemical and conformational structures as those of the original polysaccharide.

DETAILED DESCRIPTION OF THE PREFERRED EMBODIMENTS

Figure 1:
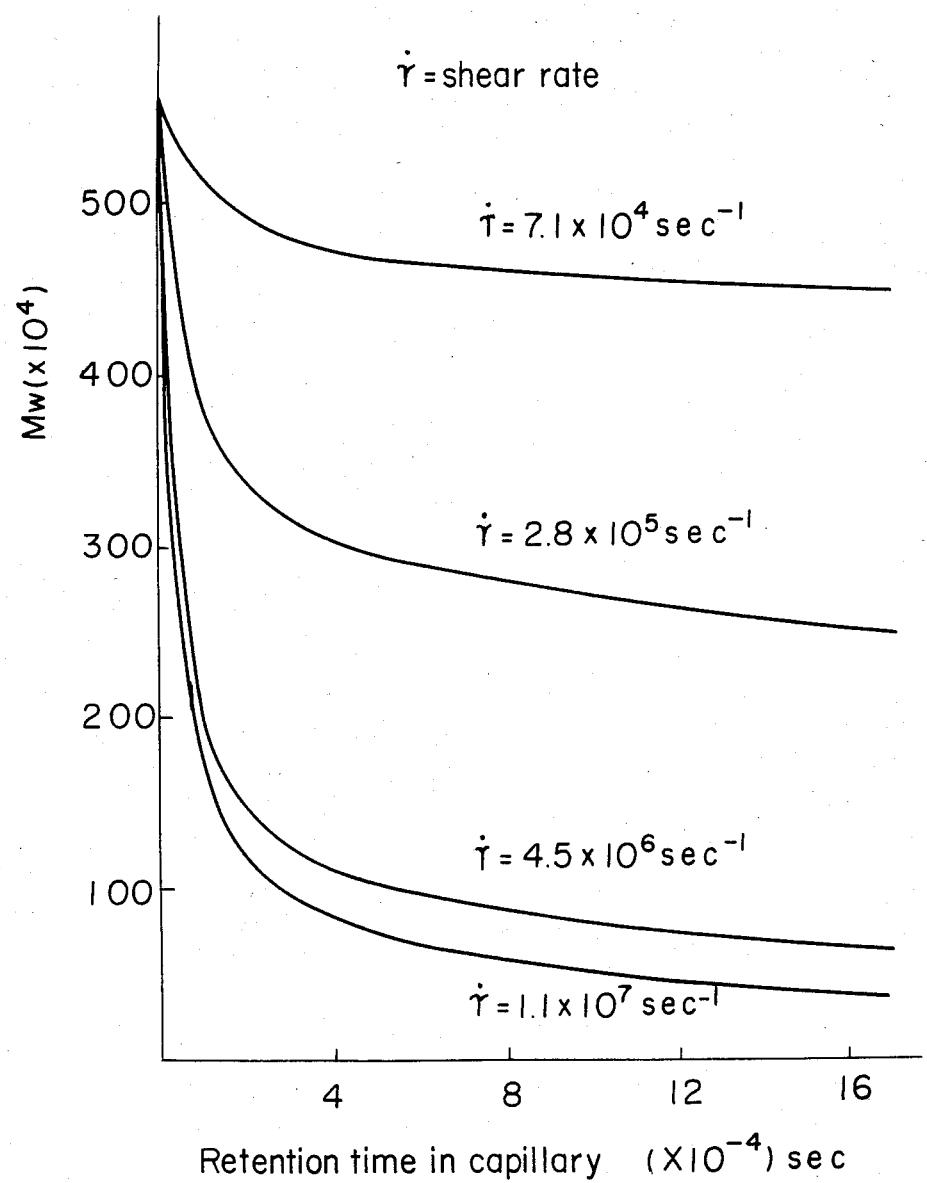

The depolymerization of the polysaccharide is performed by forcing a solution of the polysaccharide to pass through a capillary such as nozzle, slit, or porous sintered plate or ceramics, using a high pressure-driving force.

The depolymerization-velocity depends only on the value of the shear rate applied, which results from the driving force, pressure, diameter and length of the capillary used, and the viscosity of the solution. While repetition of the passage of the solution through a capillary in a certain condition, the molecular weight of the polysaccharide gradually decreases, approaching a minimum value, from which no further depolymerization occurs. The minimum molecular weight also depends on the value of the shear rate applied; higher shear rate gives lower minimum molecular weight.

Thus, the value of the shear rate applied is a dominant factor for the present method. No substantial depolymerization occurs at too low shear rate. Generally, a shear rate at least higher than $1 \times 10^4$ sec$^{-1}$ is necessary for the present depolymerization method.

In order to give such a high shear rate, the pressure applied to the polysaccharide-solution and the cross-sectional area of the capillary are 20–800 kg/cm$^2$ and $1 \times 10^{-4}$–100 mm$^2$, respectively. But these values are not limited.

The present invention includes the finding that 1. Increase in the concentration of the polysaccharide-solution increases the efficiency of the depolymerization. 2. Addition of a solvent (solvent B), which is miscible with the solvent (solvent A) of the polysaccharide-solution and does not dissolve the polysaccharide, to the polysaccharide-solution also increases the efficiency of the depolymerization.

The effect of the increase in the concentration of the polysaccharide-solution reveals significantly, when it is higher than 0.1 wt.%. Although the concentration is desirable to be as high as possible, a part of the polysaccharide tends to remain undissolved at too high concentration, because of its low solubility. Thus, practically, the concentration is preferably 0.1–10 wt.%.

The solvent B is exemplified by acetone, methanol, ethanol, iso- or n-propanol, tetrahydrofuran, etc. when the solvent A is water. In most cases, water is useful as the solvent A, but, for a water-insoluble derivative of the polysaccharide such as N-alkylol amide derivative of the polysaccharide, that still has a helical conformation similar to that of the original polysaccharide, acetone or benzene is used as the solvent A, and water, as solvent B.

Although the depolymerization efficiency increases as the amount of the solvent B added increases, its amount must be limited so that no insoluble precipitate of the polysaccharide is formed.

The temperature gives no significant influence upon the result of the present depolymerization method. Therefore, the depolymerization is usually performed at a temperature lower than 100° C.

In order to depolymerize the polysaccharide to a certain molecular weight, its solution is forced through a capillary repeatedly until its molecular weight reaches the desired value.

Particles suspending in the polysaccharide-solution often clog the capillary, leading to interruption of the operation. Thus, the solution is preferably filtered before its passage through the capillary.

Since a solution of the polysaccharide is viscous and adhesive, a considerable amount of the solution remains in vessels or other equipments used, after its discharge from them. In order to prevent the adhesion of the solution on inner surfaces of the vessels or equipments, it is desirable to agitate the solution moderately. The moderate agitation also prevents retention of a part of the solution adhering on the equipment-walls, resulting in uniform depolymerization of the polysaccharide.

EXAMPLE 1

Schizophyllan having $5.6 \times 10^6$ molecular weight was dissolved in water, to prepare a 0.2 wt.% solution. The solution was forced to pass through a nozzle of 0.16 mm radius, by being driven by a plunger pump. The flow rate of the solution was adjusted to each 0.23 cm$^3$/sec., 0.90 cm$^3$/sec., 14.5 cm$^3$/sec. and 35.4 cm$^3$/sec. by control of the speed of the pump. The shear rate computed for each flow rate from the following formula was $7.1 \times 10^4$ sec$^{-1}$ for 0.23 cm$^3$/sec flow rate, $2.8 \times 10^5$ sec$^{-1}$ for 0.90 cm$^3$/sec flow rate, $4.5 \times 10^6$ sec$^{-1}$ for 14.5 cm$^3$/sec flow rate, and $1.1 \times 10^7$ sec$^{-1}$ for 35.4 cm$^3$/sec flow rate, respectively.

$$\text{shear rate} = \frac{4 \times \text{flow rate}}{\pi \times (\text{radius of the capillary})^3}$$

FIG. 1 shows the relationship between the retention time of the solution in the nozzle and the molecular weight of the polysaccharide.

The starting schizophyllan and all the depolymerized schizophyllans were methylated by the Hakomori method and then hydrolyzed with formic acid and subsequently trifluoro acetic acid. The hydrolyzate was acetylated with anhydrous acetic acid in pyridine. The sugar-components in the product were analyzed by gas-liquid chromatography, resulting in that it contained 1,5-di-O-acetyl-2,3,4,6-tetra-O-methyl-D-glucitol, 1,3,5-tri-O-acetyl-2,4,6-tri-O-methyl glucitol and 1,3,5,6-tetra-O-acetyl-2,4-di-O-methyl-D-glucitol in a molar ratio 1:2:1.

The starting schizophyllan and all the depolymerized schizophyllans were oxidized with 0.01N sodium meta-periodate and the amounts of sodium meta-periodate consumed and formic acid formed were determined by iodometry followed by the titration with sodium hydroxide solution. As the results, 0.48–0.55 mol sodium meta-periodate was consumed and 0.21–0.27 mol formic acid was formed, per 1 mol glucose residue in schizophyllan.

The starting schizophyllan and all the depolymerized schizophyllans were degraded with exo-beta-1,3-D-glucanase. The degraded product was confirmed to contain glucose and gentiobiose in a molar ratio 2:1.

The molecular weights of the starting schizophyllan and all the depolymerized schizophyllans in water and also in dimethyl sulfoxide were determined by the ultracentrifugal method. Each ratio of the molecular weight in water to that in dimethyl sulfoxide was in the range between 2.8 and 3.3.

These results indicated that each depolymerized polysaccharide had the same chemical and conformational structures as those of the starting polysaccharide.

EXAMPLE 2

Scleroglucan having $5 \times 10^6$ molecular weight and xanthan gum having $1.4 \times 10^7$ molecular weight were dissolved in water, to prepare each 0.5 wt.% aqueous solution.

A pressure, 200 kg/cm$^2$, was applied to each solution and it was allowed to pass through a nozzle of 0.1 mm radius and 5 cm length. The flow rates were 1.4 cm$^3$/sec for scleroglucan and $7.4 \times 10^{-1}$ cm$^3$/sec for xanthan gum, respectively. Thus, shear rates calculated from the following formula were $1.8 \times 10^6$ sec$^{-1}$ for scleroglucan and $9.4 \times 10^5$ sec$^{-1}$ for xanthan gum.

$$\text{shear rate} = \frac{4 \times \text{flow rate}}{\pi \times (\text{radius of the capillary})^3}$$

Each solution was allowed to pass through the nozzle ten-times in the foregoing condition. The depolymerized scleroglucan has molecular weight, $8 \times 10^5$ and the depolymerized xanthan gum, $1.05 \times 10^6$, respectively.

The starting and resulting polysaccharides were methylated and subsequently acetylated as described in Example 1, and then the components in the products were analyzed by gas-liquid chromatography. The analyses showed that each depolymerized polysaccharide had essentially the same primary structure as that of the corresponding starting polysaccharide. The ratios of the molecular weights in water to those in dimethyl sulfoxide of the starting and depolymerized scleroglucans were close to three, showing the resemblance between the conformational structures of both scleroglucans. The intrinsic viscosities of the starting xanthan gum and the depolymerized one were 12000 dl/g and 1070 dl/g, respectively. The relationship between the intrinsic viscosity and the molecular weight of each starting and depolymerized xanthan gum was consistent with the relationship determined by Holzwarth et. al (G. Holzwarth; Carbohydrate Research 66, 173–186 (1978)), indicating that both xanthan gum had similar helical structures.

EXAMPLE 3

Schizophyllan having $2 \times 10^6$ molecular weight was dissolved in water, a mixture of 20 wt.% acetone and 80 wt.% of water, and a mixture of 20 wt.% ethanol and 80 wt.% of water, in each 0.8 wt.% concentration. Each solution was forced to pass through a sintered plate having 1 cm thickness and 50 micron mean pore size, with 400 kg/cm² pressure. It was evident from the following formula that the shear rate for each solution was higher than $2.5 \times 10^6$ sec$^{-1}$.

Shear rate =

$$\frac{(\text{pressure}) \times (\text{diameter of the capillary})}{2 \times (\text{viscosity of the solution}) \times (\text{length of the capillary})}$$

The viscosity of each solution was lower than 38 c.p.

After 5-times passages of each solution through the sintered plate, polysaccharide had the following molecular weight.

|  | Molecular weight |
| --- | --- |
| Aqueous ethanol solution | $5.3 \times 10^5$ |
| Aqueous acetone solution | $6.0 \times 10^5$ |
| Water | $7.8 \times 10^5$ |

EXAMPLE 4

Scleroglucan having $5.2 \times 10^6$ molecular weight was dissolved in water, to prepare each 0.1 wt.%, 0.45 wt.% and 0.90 wt.% aqueous solution. Each solution was driven by 170 kg/cm² pressure to pass through a nozzle of 0.16 mm radius. After 20-times passage, the polysaccharide in each solution had the following molecular weight.

| Concentration of the solution | Molecular weight |
| --- | --- |
| 0.1 wt. % | $5.8 \times 10^5$ |
| 0.45 wt. % | $4.2 \times 10^5$ |
| 0.90 wt. % | $2.8 \times 10^5$ |

EXAMPLE 5

A 1.0 wt.% aqueous solution of the schizophyllan used in Example 1 was filtrated using a ceramic-filter having 0.1 mm pores. A pressure of 50 kg/cm² was applied to a vessel filled with the filtrate, to force it to pass through a nozzle of 0.15 mm radius and recirculated to the vessel. The filtrate was agitated in the vessel at Reynold's number=120. The operation continued for 8 hours. The molecular weight of schizophyllan was $3.7 \times 10^6$ after the operation. After the solution was discharged from the vessel, 100 ml of the solution remained in the vessel adhering on its inner surface.

The same schizophyllan solution was forced to pass through the same nozzle with neither its filtration with the ceramic filter nor agitation during its treatment. The operation was interrupted several times due to the clogging of the nozzle with particles suspending in the solution. After the solution was discharged from the vessel, 2,500 ml of the solution collected in the bottom of the vessel, running down along the wall.

We claim:

1. A process for depolymerization of a polysaccharide having a rod-like structure, comprising a step for forcing a solution of about 0.1–10 wt. % of polysaccharide in a solvent (solvent A) through a capillary at a shear rate higher than $1 \times 10^4$ Sec$^{-1}$, to produce a lower molecular weight degraded polysaccharide, which has the same repeating unit and the same helical structure, as those of the original polysaccharide.

2. A process according to claim 2 wherein the polysaccharide is a beta-1,3-D glucan.

3. A process according to claim 1 wherein the polysaccharide is schizophyllan.

4. A process according to claim 1 wherein the polysaccharide is scleroglucan.

5. A process according to claim 1 wherein the polysaccharide is xanthan gum.

6. A process according to claim 1 wherein solvent A is water.

7. A process according to claim 1 wherein a solvent (solvent B) other than solvent A, which is a poor solvent or non-solvent of the polysaccharide and also miscible with solvent A, is added in the polysaccharide solution.

8. A process according to claim 1 wherein the polysaccharide solution is filtrated before its treatment at a higher shear rate.

9. A process according to claim 1 wherein the polysaccharide solution is moderately agitated during the treatment at a high shear rate.

* * * * *